United States Patent [19]
Stewart

[11] Patent Number: 5,630,669
[45] Date of Patent: May 20, 1997

[54] SPLIT BEARING, CAGE FOR SPLIT OR NON-SPLIT BEARING AND METHOD OF CUTTING A MEMBER OF A SPLIT BEARING

[75] Inventor: Robert N. Stewart, Hampton, Va.

[73] Assignee: Craft Bearing Company, Inc., Hampton, Va.

[21] Appl. No.: 273,840

[22] Filed: Jul. 12, 1994

[51] Int. Cl.[6] .................................................. F16C 33/51
[52] U.S. Cl. ........................................................ 384/570
[58] Field of Search ................................. 384/462, 570, 384/577, 578, 564, 569, 579

[56] References Cited

U.S. PATENT DOCUMENTS

| | | |
|---|---|---|
| 751,715 | 2/1904 | Butler . |
| 1,463,299 | 7/1923 | Staake . |
| 1,481,000 | 1/1924 | Erickson . |
| 1,498,748 | 6/1924 | Pierce, Jr. . |
| 1,715,268 | 5/1929 | Ayers, Jr. . |
| 1,967,821 | 7/1934 | Hess ................................. 29/148.4 |
| 1,972,140 | 9/1934 | Frank ................................ 384/570 |
| 2,500,592 | 3/1950 | Whiteley . |
| 2,650,864 | 9/1953 | Mergen . |
| 2,850,311 | 9/1958 | Mansfield ........................... 288/13 |
| 2,895,769 | 7/1959 | Dwyer . |
| 3,140,130 | 7/1964 | Barr ................................... 384/570 |
| 3,166,363 | 1/1965 | Kay . |
| 3,262,185 | 7/1966 | Hornigold ........................... 29/148.4 |
| 3,304,140 | 2/1967 | Hornigold . |
| 3,499,200 | 3/1970 | Wilson ............................... 29/148.4 |
| 3,522,976 | 8/1970 | Spyra . |
| 3,597,025 | 8/1971 | Ringel . |
| 3,597,819 | 8/1971 | Scheifele ............................ 29/148.4 |
| 3,657,781 | 4/1972 | Camosso ............................ 29/148.4 |
| 3,944,307 | 3/1976 | Bingle ................................ 384/578 |
| 3,946,617 | 3/1976 | Moriarty ............................... 74/60 |
| 3,963,284 | 6/1976 | Bouchard . |
| 3,978,566 | 9/1976 | Ladin ................................. 29/148.4 |
| 4,194,797 | 3/1980 | Hormann et al. . |
| 4,212,095 | 7/1980 | Warchol ............................. 29/148.4 |
| 4,322,878 | 4/1982 | Warchol ............................. 29/148.4 |
| 4,397,507 | 8/1983 | Kraus et al. ........................ 384/577 |
| 4,688,953 | 8/1987 | Koch et al. ........................ 384/615 |
| 4,765,757 | 8/1988 | Hartl ................................. 384/213 |
| 4,820,894 | 4/1989 | Francoia et al. .................. 219/69.12 |
| 4,883,934 | 11/1989 | Mamin et al. .................... 219/69.12 |
| 5,033,876 | 7/1991 | Kraus ................................ 384/577 |
| 5,039,230 | 8/1991 | Phillips et al. .................... 384/560 |
| 5,290,987 | 3/1994 | Davis et al. ...................... 219/69.11 |

Primary Examiner—Lenard A. Footland
Attorney, Agent, or Firm—Jones, Tullar & Cooper, P.C.

[57] ABSTRACT

A split bearing, a cage for a split or non-split bearing and a method of cutting a member of a split bearing is related in this disclosure. The split bearing has at least one component, such as the outer race, split, i.e., formed into at least two parts, each part defining two longitudinally extending surfaces which mate with a corresponding longitudinal surface of the adjacent part such that the mating surfaces define a helix in their longitudinal extent. The cage of the split or non-split bearing includes two annular parts that in assembly define a plurality of cavities each one adapted to receive a roller member of the bearing. Each of the two annular parts including at least two pieces joined together by a tongue and groove connection. The method of cutting a member of a split bearing involves cutting the member longitudinally such that the cut mating surfaces, define a helix in the longitudinal direction.

10 Claims, 8 Drawing Sheets

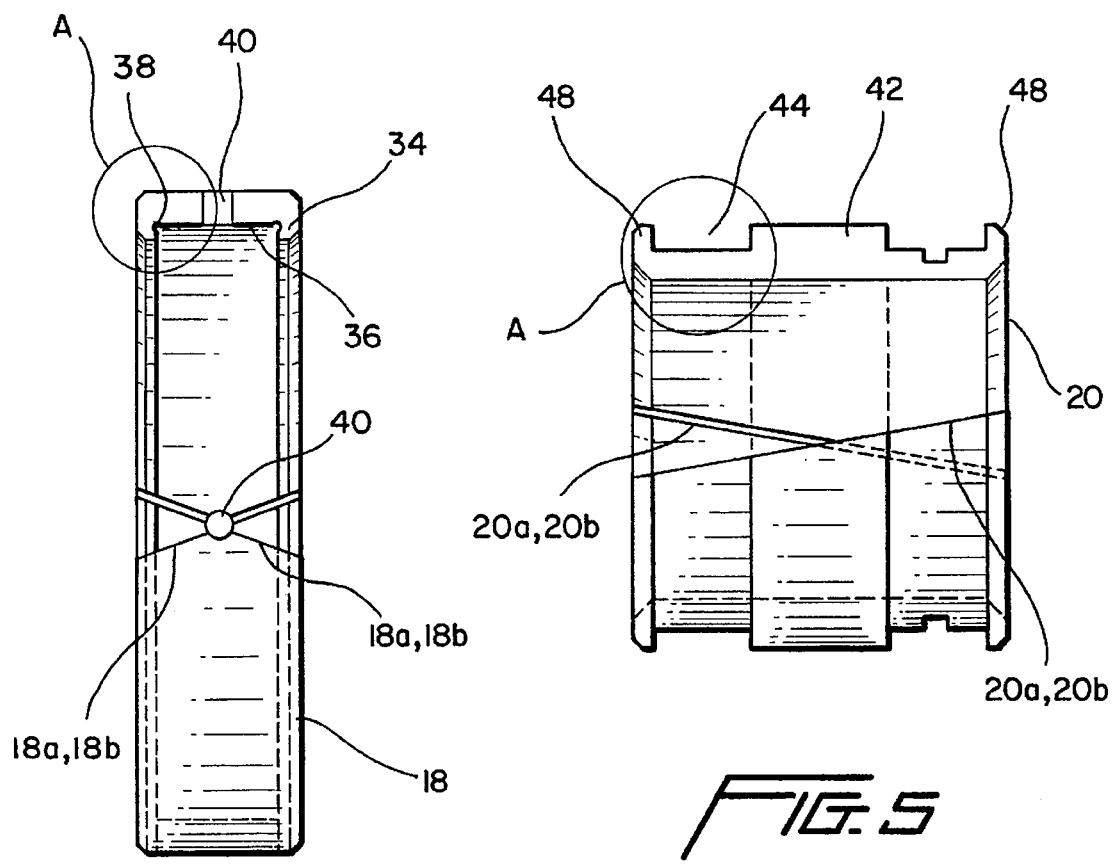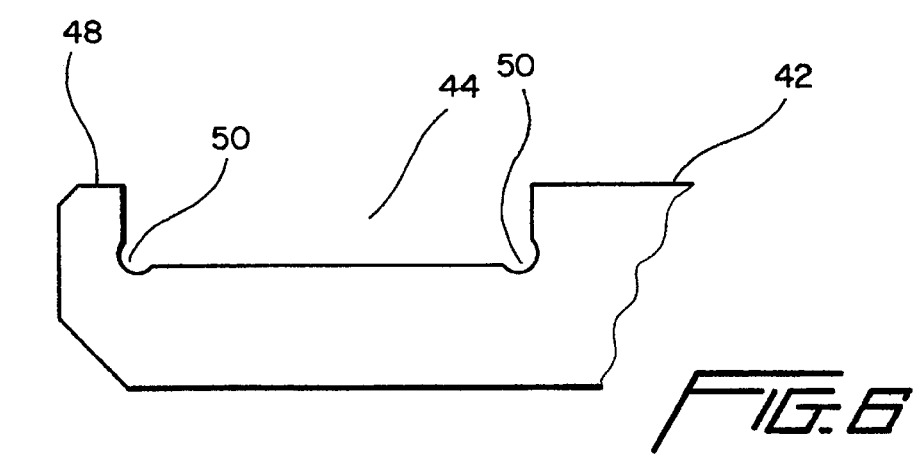

SPLIT BEARING, CAGE FOR SPLIT OR NON-SPLIT BEARING AND METHOD OF CUTTING A MEMBER OF A SPLIT BEARING

BACKGROUND OF THE INVENTION

1. Field of The Invention

The present invention relates to the field of bearings, and in particular to split bearings.

2. Background Discussion

Split bearings, i.e., a bearing with both the inner and outer race formed in two parts have been used in industry for various applications for a number of years. U.S. Pat. No. 3,304,140 is an example of such a bearing.

One of the important advantages of a split bearing is its ease of assembly and disassembly. During periodic maintenance or overall operations, the disassembly feature is quite helpful in avoiding unnecessary or excessive dismantling of associated equipment.

A disadvantage of split bearings is that they are more expensive to fabricate, and also they are more prone to failure due to the fact that they comprise sections (parts such as noted above) which are necessarily load bearing. Whenever a structural part is subject to load, forming the structural part in sections inherently tends to weaken the part. The cut surface, in particular, can experience fretting. Fretting can lead to bearing failure. One reason fretting is a problem is because the mating cut surfaces move relative to each other.

Accordingly, bearing designers have focused their attention on reducing the relative motion of the cut surfaces.

SUMMARY OF THE INVENTION

The present invention also focuses on the cut surfaces. In particular, on how they can be better mated to avoid relative motion.

The structural parts of most bearings are generally cylindrical in shape. Certainly, the inner and outer race and the ball or roller cage are cylindrical. It is noted that for a rotating cylinder a compatible form is a helix (for example, a gear and gear teeth or a screw and screw threads). It was believed that a helical cut surface, i.e., a surface which extends along a helical path about a cylinder when viewed in the longitudinal direction of the cylinder, would provide the optimum mating surfaces which would reduce, if not eliminate, relative motion.

A helix is a curve wound around the outside of a cylinder or cone advancing uniformly along the axis as it winds around the outer surface of the cylinder. (Elements of Mechanisms, Doughtie and James, John Wiley & Sons, Inc., 1954, pages 303–305).

FIG. 1 illustrates a line (H) wound about a cylinder (C) helically. The helix angle ($\propto$), is the angle that a straight line tangent to the helix at any point makes with an element of the cylinder. The lead (L) is the distance by which the helix advances along the longitudinal axis A—A of the cylinder for one turn around the cylinder, while the pitch (P) is the distance between a point on the helix and the corresponding point on the next turn of a single helix.

With the present invention, the pitch (P) and helix angle ($\propto$) are high.

Until the advent of the wire electric discharge machine, cutting a cylinder wall such that the cut surface extends along a helix when viewed in its longitudinal extent was virtually impossible. Another direction to accomplish this helix would be through the development of the water jet cutting machine.

A split bearing, i.e., a bearing with at least its outer race formed in at least two parts, is proposed, and in particular a split bearing with both its inner and outer race formed in at least two parts, such that the cut and mating surface(s) are developed helically along the longitudinal axis of the bearing.

The helical cut surface(s) would each be substantially perpendicular to the longitudinal axis and would develop as a helical line that could be at any helix angle to the longitudinal axis.

The split bearing proposed would have all its split surfaces formed by a wire electric discharge machine. Accordingly, the present invention also contemplates a method of producing a cut surface to form a split bearing where at least the outer race of the bearing is cut into at least two pieces.

The present invention also contemplates forming edge grooves adjacent the race flanges for improved lubrication. These grooves are provided in addition to the annular grooves in a bearing housing which serve as the typical oil or grease carriers in anti-friction bearings. These grooves increase the lubrication of the rolling components, and retain grease and oil at the point needed for good lubrication. There is also a manufacturing benefit because the grinding wheels needed to surface finish the race have less material to remove and would not need to be formed to produce the corner shape that is typical in bearing races. These corners also would minimize stress concentration in the heat treating process of the races.

The present invention also contemplates a cage design used with a split or a non-split bearing, the cage is split horizontally as well as axially to form a four piece assembly. The four piece assembly is die-cast more efficiently and is riveted together in halves at the time of roller installation and these halves are then held together with a spring locking clip that will have shear capability if the halves would ever bend in a centrifugal load situation. The locking spring clip would have to be sheared to separate the halves. Also, the ease of assembly is improved and its position is more precise because of a tongue and groove assembly of the halves. This tongue and groove may also be provided with a cylindrical fit or notched to further limit movement (See FIG. 14).

Because of the need for draft angles in the die-casting process, the cavities that retain the rollers will have smaller angular fits with the rollers and the small draft angles will retain lubrication that serves to improve the life of the roller cage and the rollers.

Ease of cage assembly is also a benefit. Semi-tubular rivets will hold two of the four die-cast parts as the rollers are installed. This cage design also will control the movement and clearance of the rollers in the cage more precisely and allow better concentricity and balance for the assembled bearing.

BRIEF DESCRIPTION OF THE DRAWINGS

Fourteen figures have been selected to illustrate a preferred embodiment of the various aspects of the present invention. The figures are schematic but nonetheless sufficiently detailed to enable those skilled in the art to practice the present invention in all its aspects. Included are:

FIG. 4, which is a side view, partly in cross section of an outer race of a split bearing according to the present invention;

FIG. 5, which is a side view, partly in cross section of an inner race of a split bearing according to the present invention;

FIG. 6, which is an enlarged view of detail A of FIG. 4;

DETAILED DESCRIPTION OF THE FIGURES

Figure 1:
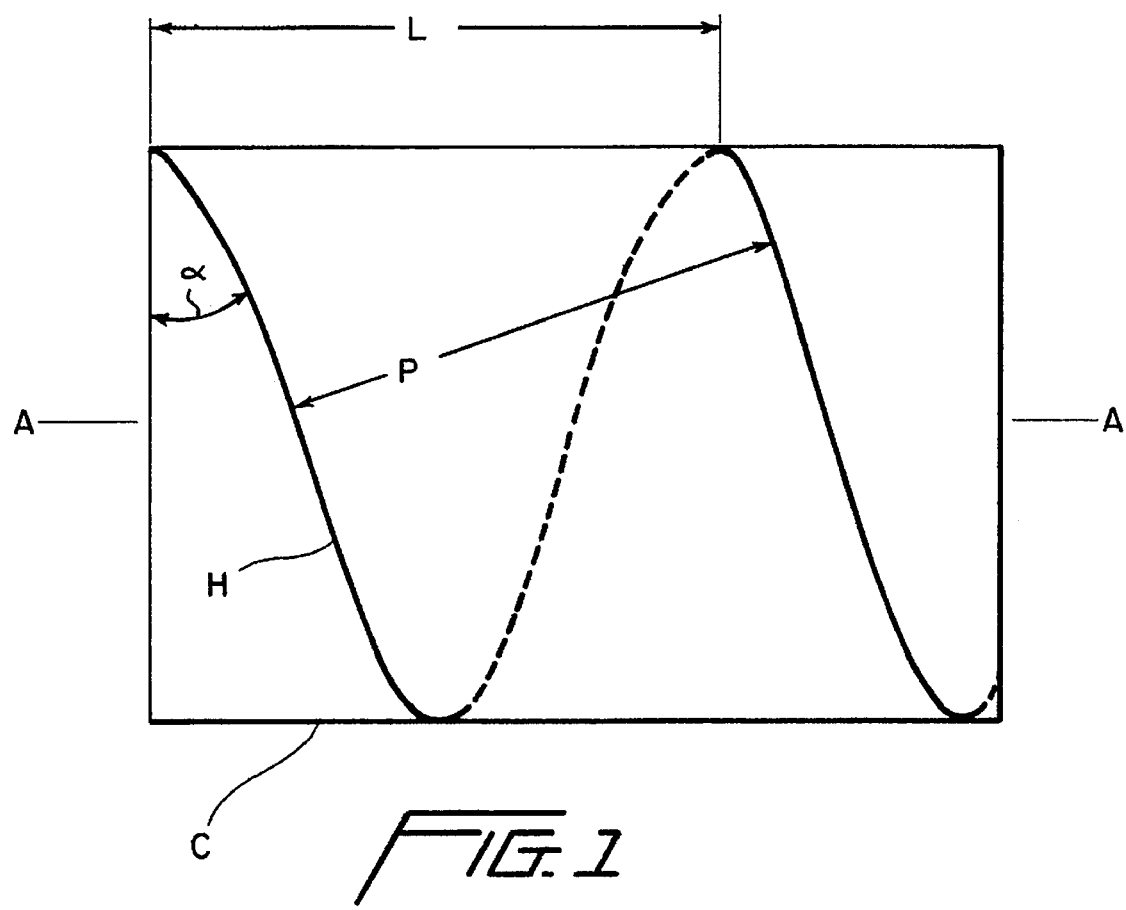
FIG. 1, which is an explanatory view illustrating the general form of a helix on a cylinder.
Figure 2:
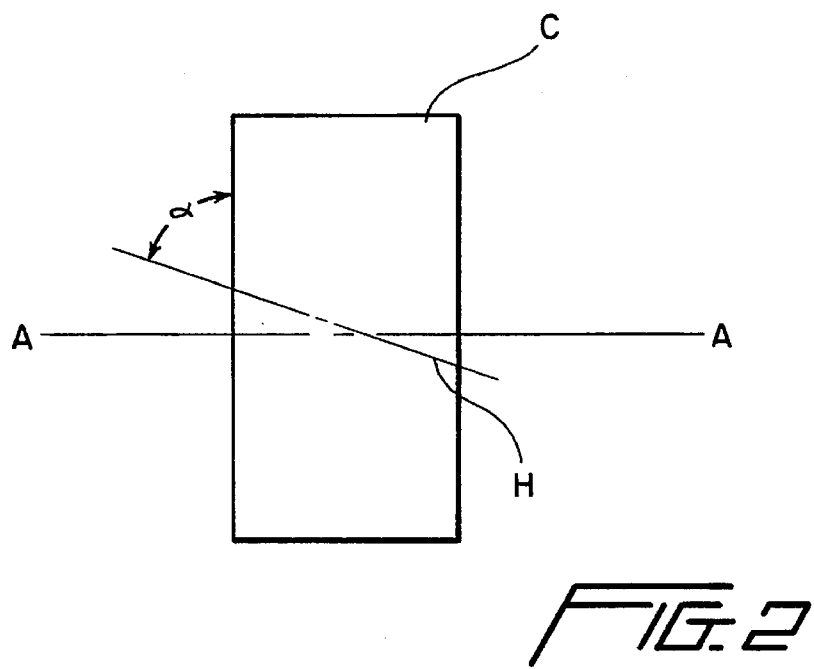
FIG. 2, which is a further explanatory view illustrating a typical helix cut on a split bearing.

The helix H as shown in FIG. 1 when generated on a bearing part in accordance with the present invention, is shown in FIG. 2.

In FIG. 2, the cylinder C becomes a cylindrical part of a bearing and the line H becomes the helical cut surface. The helix angle illustrated is much larger than that shown in FIG. 1 because in practice the bearing part is cut into at least two parts.

A machine and procedure for making such a helical cut are disclosed, for example, in U.S. Pat. No. 5,290,987. The disclose of this patent is hereby incorporated by reference.

Any cylindrically shaped part of the bearing may be fabricated to include at least two parts formed as such by being cut to define two pairs of mating longitudinally extending surfaces. For example, the line H of FIG. 2 represents one pair of mated longitudinally extending surfaces formed on a helix of the cylindrical part C. It is necessary to generate this helical cut by passing a line through the cylinder axis as the part is rotated through the desired helical angle.

Figure 3:
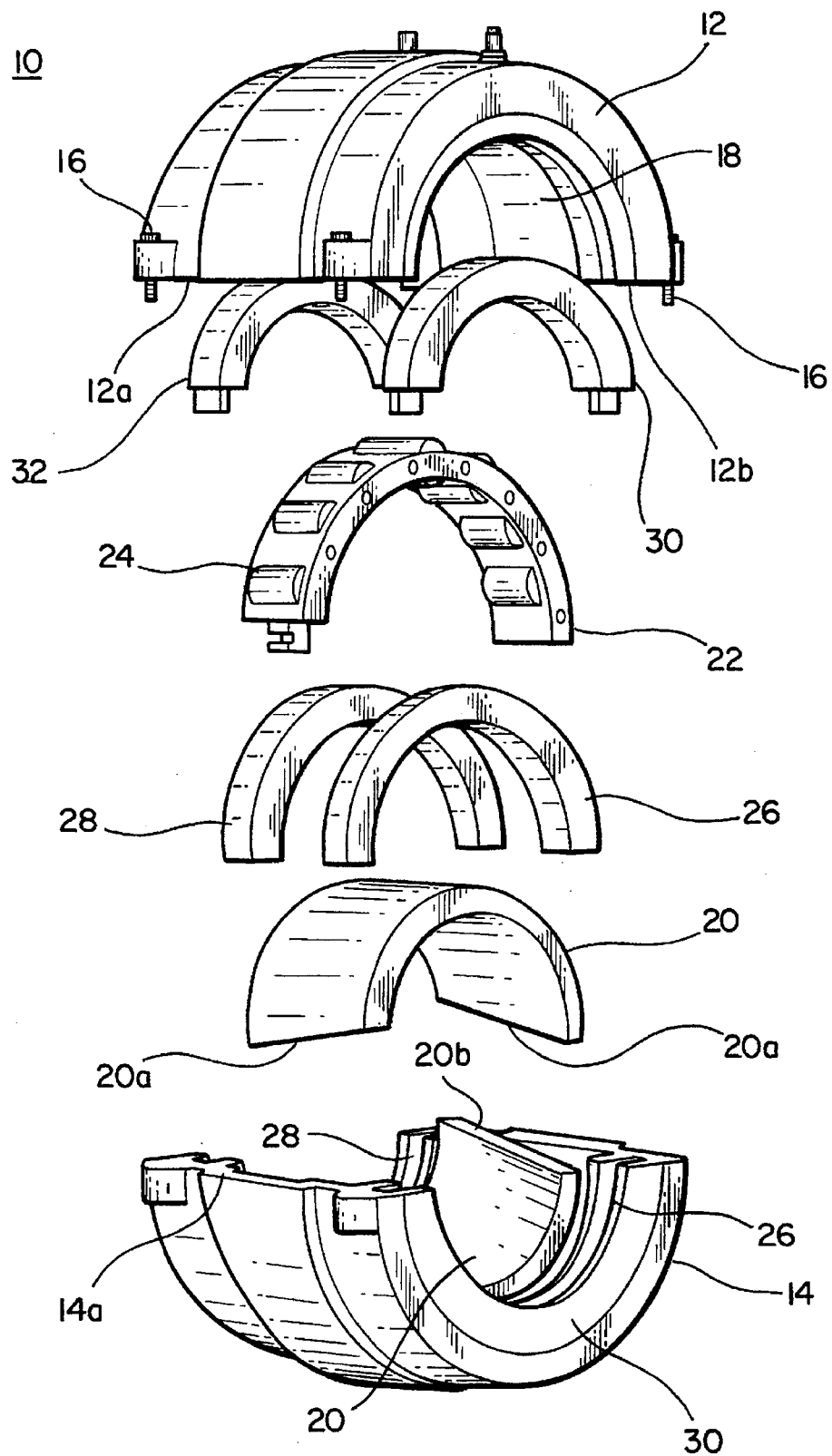
FIG. 3, which is exploded perspective view of a split bearing which embodies all the various aspects of the present invention.
Figure 7:
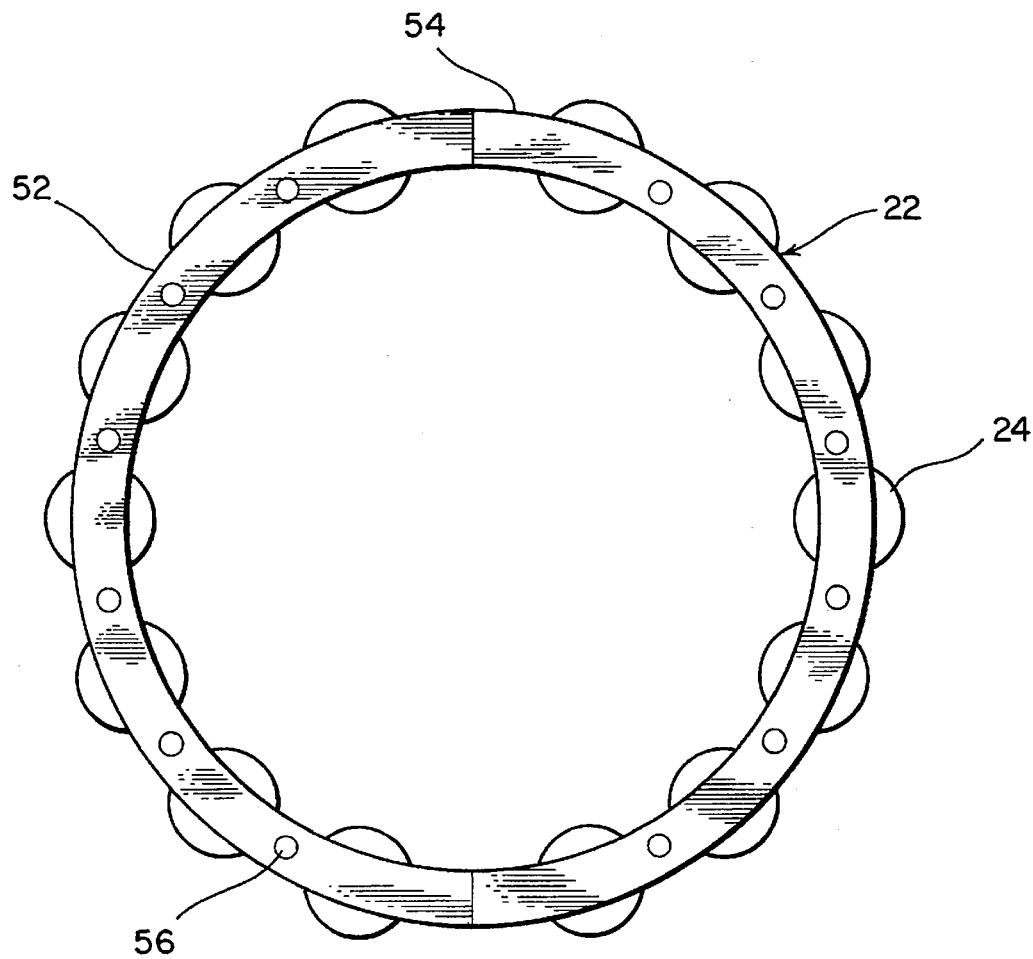
FIG. 7, which is a plane view of an assembled bearing cage and roller bearings according to the present invention.

Turning to FIG. 3, a split bearing 10 is shown embodying the various features of the present invention. The bearing 10 includes an upper cartridge 12 and a lower cartridge 14. These cartridges form an outer housing of the bearing and are connected to each other by bolts 16. The cartridges 12 and 14 are shown to include mating surfaces 12a, 12b when connected. These surfaces are shown as straight surfaces and not as helical. However, these surfaces may be formed as helical surfaces.

Mounted within the cartridges 12 and 14 are an outer race 18, an inner race 20, a cage 22 with roller elements 24, two clamping rings 26 and 28 and two seals 30 and 32. As shown, the inner race 20 is formed in two parts with helically cut mating surfaces 20a, 20b. The outer race 18 is also formed in two parts with helically cut mating surfaces 18a, 18b (shown in FIG. 4). The surfaces 18a, 18b and 20a, 20b are formed by cutting the respective races 18 and 20 with a machine similar to that noted above.

The races 12 and 14 are shown in more detail in FIGS. 4 and 5, with FIG. 6 showing an enlarged view A of a portion of both races, but with the illustration reproduced from that of FIG. 5 only.

The outer race 18 has parallel flanges 34 separated by a roller member engaging surface or land 36. At the two edges defined by the flanges 34 and the surface 36, there is defined a lubricating groove 38. Spaced about the outer race 18 are several lubricating bores 40.

The inner race 20 includes a roller member engaging surface or land 42 which coincides in width to the width of surface 36. On either side of the surface 42 there is included a recess 44 in which a clamp 46 (FIGS. 13–14) is received. At each longitudinal end of the inner race 20 there is situated a flange 48. At the two edges defined by the flanges 48 and the surface of its corresponding recess 44 there is defined a lubricating groove 50 similar in shape and purpose to lubricating groove 38 (FIG. 6). A similar groove 50 is defined by each edge of the surface 42 and the surface of the adjacent recess.

Figure 10:
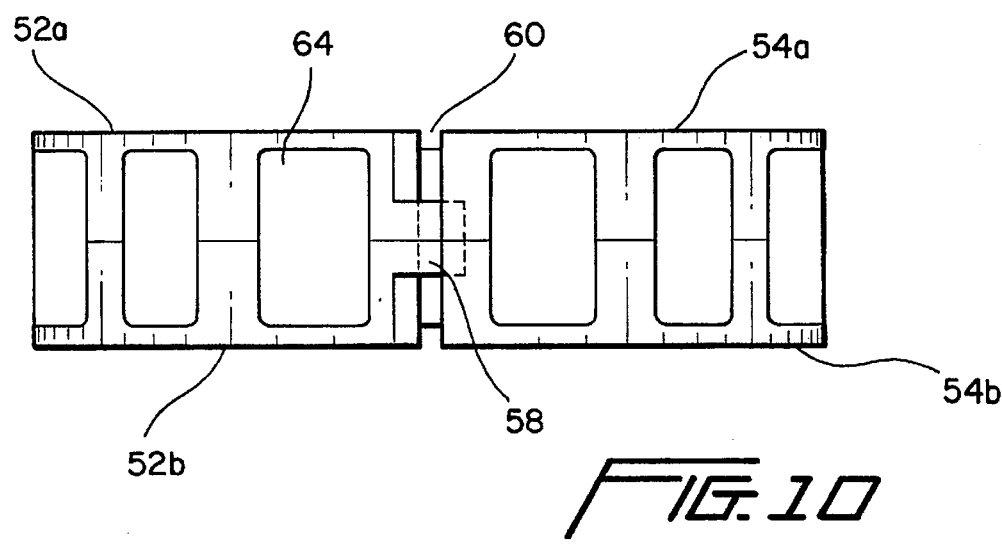
FIG. 10, which is a partial top view of the bearing cage of FIG. 6 showing a tongue and groove attachment.
Figure 12:
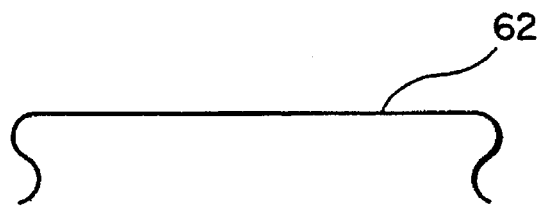
FIG. 12, which is a front view of the bearing cage clip.
Figure 8:
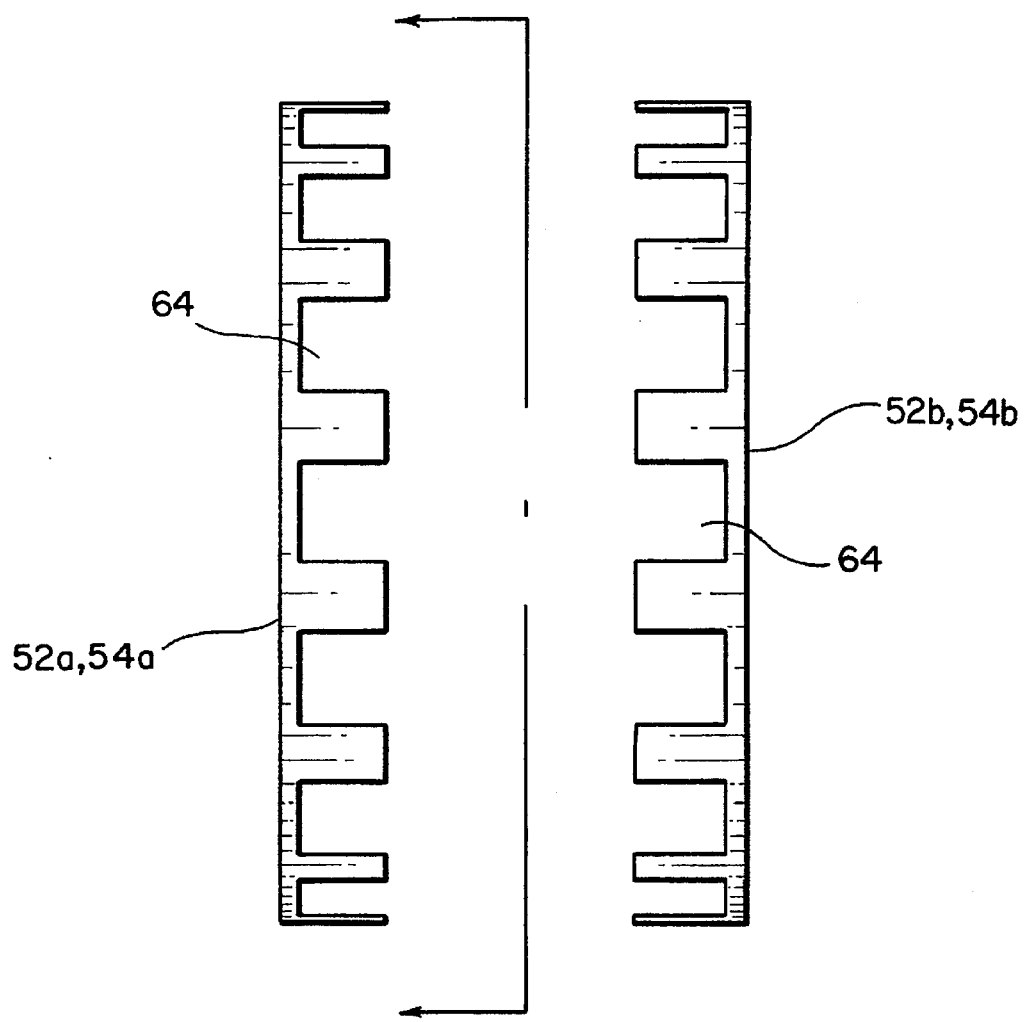
FIG. 8, which is exploded view showing the two pieces of the bearing cage of FIG. 6.
Figure 11:
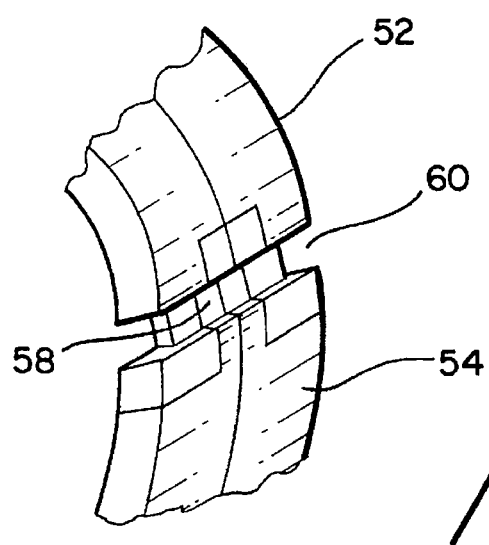
FIG. 11, which is a partial and perspective view of the bearing cage of FIG. 6 showing the tongue and groove attachment.

The cage 22 includes a plurality of roller members 24. The roller members 24 are supported by two support brackets 52 and 54 which are preferably die cast. Each bracket 52 and 54 is further made into pieces 52a, 52b and 54a, 54b. These pieces are joined together by rivets 56, while the joined pieces or brackets 52 and 54 are themselves joined by the tongue and groove arrangement 58 (FIGS. 10 and 11) at two places. At the tongue and groove arrangement 58, the brackets 52 and 54 and the tongue and groove arrangement 58 define a recess 60 which receives a spring locking clip 62 (FIG. 12). The clip 62 serves to assist in holding the tongue and groove arrangement in place.

Figure 9:
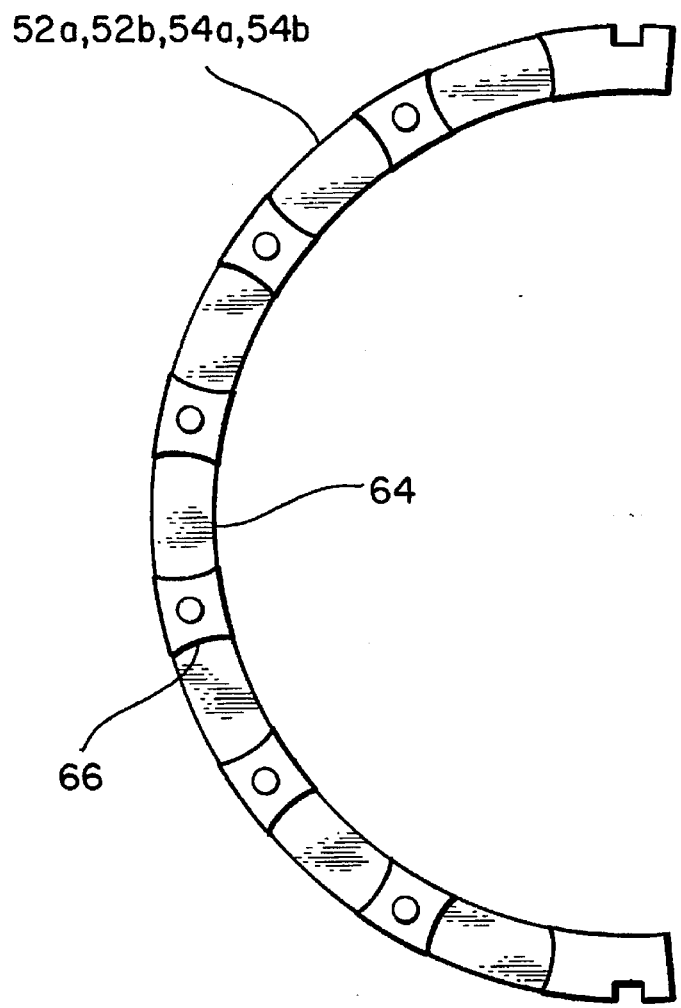
FIG. 9, which is a partial inside side view of the bearing cage of FIG. 6.

As assembled, the brackets 52 and 54 form a plurality of cavities 64 each of which receives a roller element 24. Because the pieces 52a, 52b and 54a and 54b are die cast, the sides 66 define a draft angle which serves to retain lubrication (FIG. 9).

The clamp rings are assembled about the inner race which holds the race to the shaft, then the roller cage is mounted.

Figure 13:
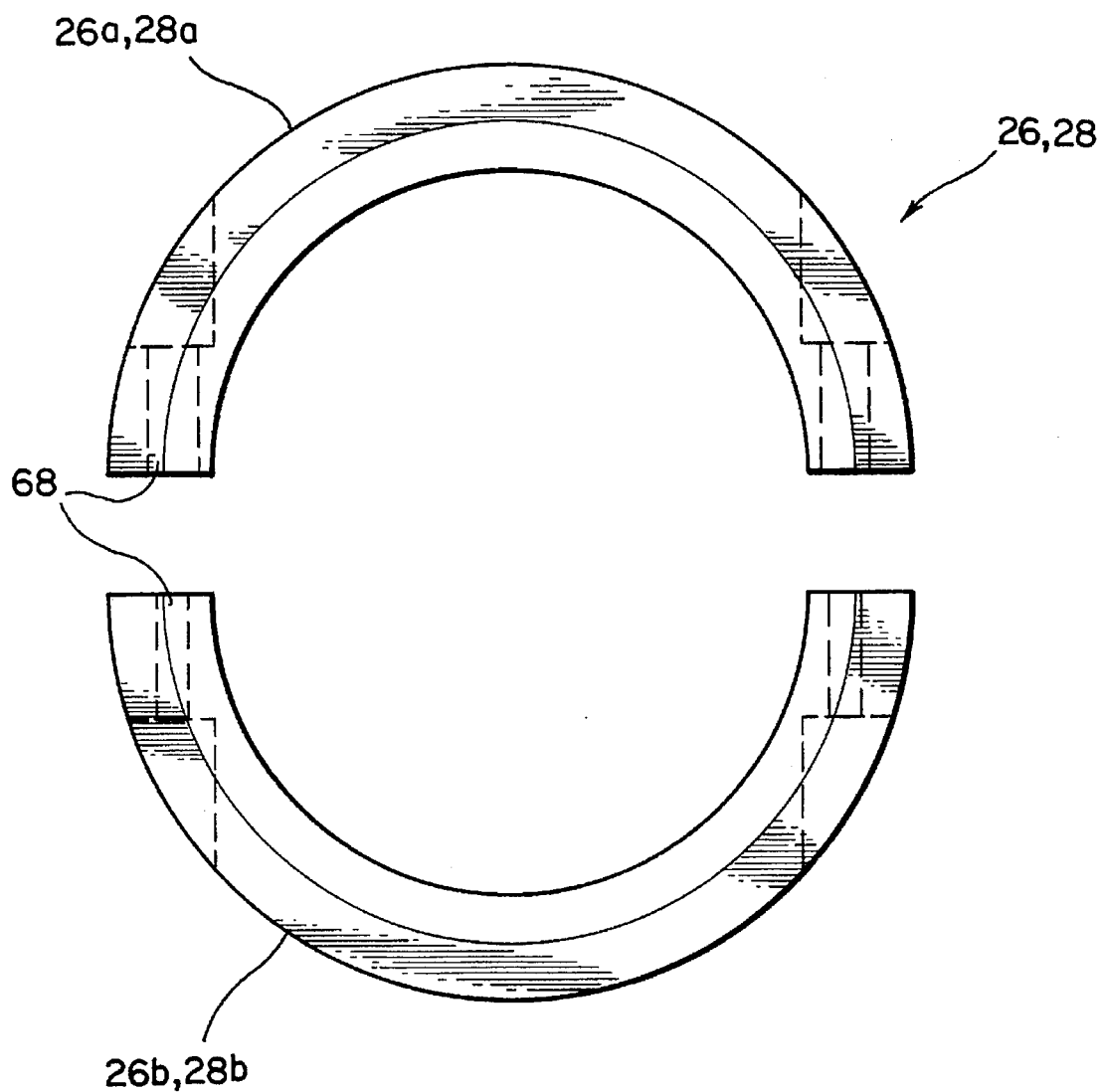
FIG. 13, which is a front view of an inner race clamp.
Figure 14:
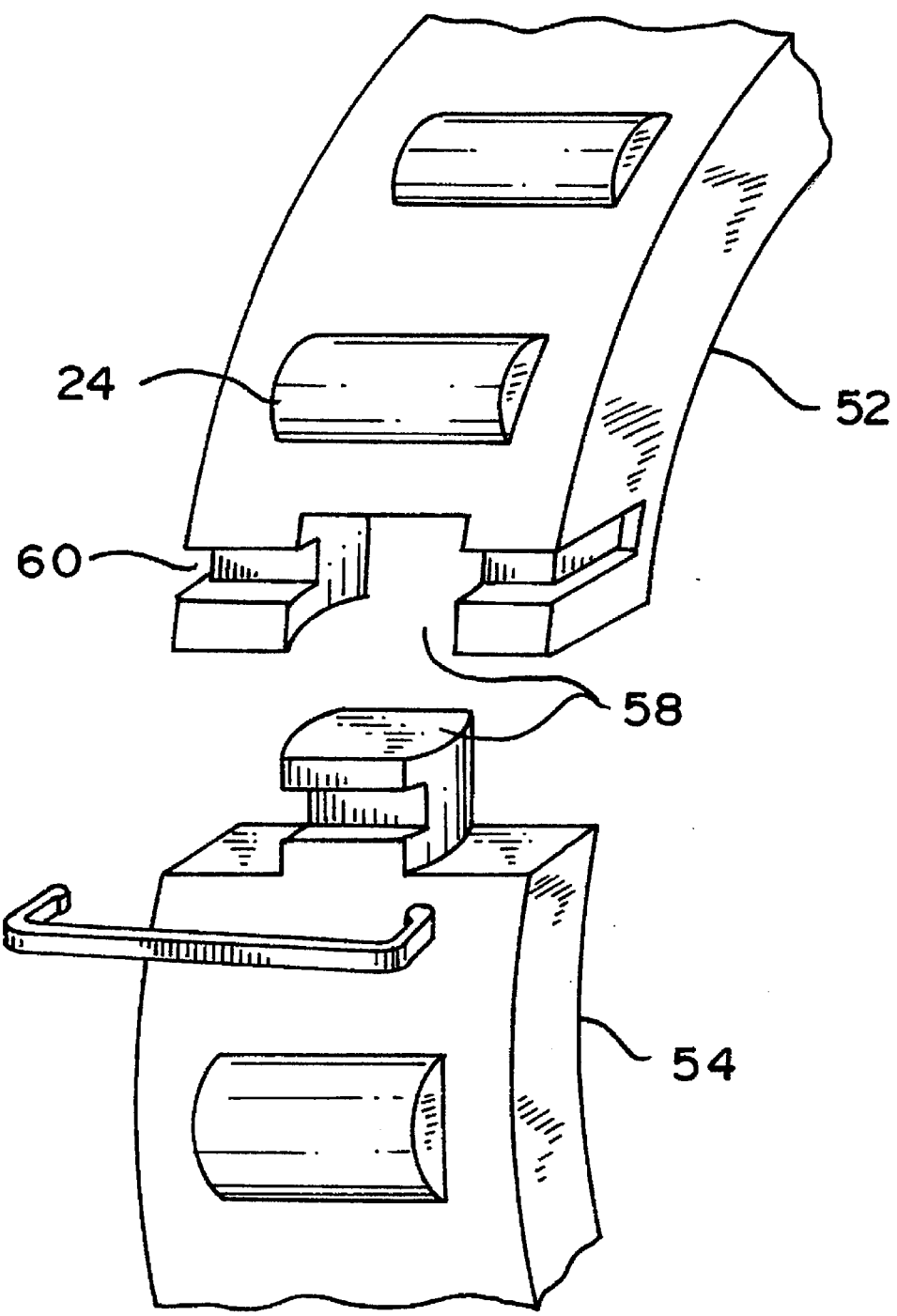
FIG. 14, which shows the cylindrical tongue and groove.

When the assembled bearing cage is mounted on the inner race and the outer race is placed in assembly, two inner race clamp rings 26 and 26 are mounted, one in each of the recesses 44. FIG. 13, shows that each ring comprises two pieces 26a, 28a and 28a, 28b. The two pieces are clamped together by bolts received in openings 68, which may be threaded, if desired.

The bearing 10 is assembled easily and efficiently by first placing the inner race about the shaft on which it is mounted. This is followed by the clamp rings which are tightened down on the inner race and position the bearing cage assembly. The bearing cage is then mounted into it's assembled form. Next, the seals are positioned and then the outer race is put in place, and finally, the cartridges are inserted and tightened down. This final step insures that all cut helix surfaces are brought into tight engagement.

The bearing 10 is, as noted, easy to assemble and disassemble. As a result, routine maintenance will not require dismantling the entire machine when all that is necessary is a bearing replacement.

What is claimed is:

1. A split bearing, comprising:
   an inner annular race having a longitudinal extent;
   an outer annular race having a longitudinal extent;
   a plurality of roller members; and
   means for retaining the plurality of roller members between the inner race and the outer race, wherein at least said outer race includes at least two parts, each part defining two longitudinally extending surfaces which mate with a corresponding longitudinal surface of the adjacent part, said surfaces defining a helix in their longitudinal extent.

2. The split bearing as defined in claim 1, wherein at least said outer race includes spaced apart annular flanges and an annular lubricating groove adjacent each flange.

3. A split bearing, comprising:

an inner annular race having a longitudinal extent;

an outer annular race having a longitudinal extent;

a plurality of roller members; and means for retaining the plurality of roller members between the inner race and the outer race, wherein at least said outer race includes at least two parts, each part defining two longitudinally extending surfaces which mate with a corresponding longitudinal surface of the adjacent part, said surfaces defining a helix in their longitudinal extent, and said inner race includes at least two parts, each part defining two longitudinally extending surfaces which mate with a corresponding longitudinal surface of the adjacent part, said surfaces defining a helix in their longitudinal extent.

4. The split bearing as defined in claim 3, further comprising a pair of annular clamps, wherein said inner race includes a land on which said plurality of roller members are engaged and a clamp recess on each side of said land for receiving a respective one of said annular clamps, each clamp recess defining longitudinally spaced apart edges, and wherein each clamp recess defines spaced apart annular lubricating grooves adjacent the longitudinal edges of each clamp recess.

5. A split bearing, comprising:

an inner annular race having a longitudinal extent;

an outer annular race having a longitudinal extent;

a plurality of roller members; and means for retaining the plurality of roller members between the inner race and the outer race, wherein at least said outer race includes at least two parts, each part defining two longitudinally extending surfaces which mate with a corresponding longitudinal surface of the adjacent part, said surfaces defining a helix in their longitudinal extent, and said means for retaining includes an annular cage having two annular parts and at least one clip for securing said two annular parts together, said two annular parts define, in assembly, a plurality of cavities each one receiving one of said plurality of roller members, each of said two annular parts including at least two pieces joined together by a tongue and groove connection.

6. The split bearing as defined in claim 5, wherein each cavity is defined by said two annular parts with the longitudinally spaced edge surfaces of each cavity being defined by a different one of said two annular parts, and wherein said longitudinally spaced edges surfaces are tapered radially outwardly toward the center of the bearing.

7. A split bearing, comprising:

an inner annular race having a longitudinal extent;

an outer annular race having a longitudinal extent;

a plurality of roller members; and means for retaining the plurality of roller members between the inner race and the outer race, wherein at least said outer race includes at least two parts, each part defining two longitudinally extending surfaces which mate with a corresponding longitudinal surface of the adjacent part, said surfaces defining a helix in their longitudinal extent, and said means for retaining includes an annular cage having a longitudinal extent, said cage including at least two parts, each part defining two longitudinally extending surfaces which mate with a corresponding longitudinal surface of the adjacent part, said surfaces defining a helix in their longitudinal extent.

8. A split bearing, comprising:

an inner annular race having a longitudinal extent;

an outer annular race having a longitudinal extent;

a plurality of roller members;

means for retaining the plurality of roller members between the inner race and the outer race; and a pair of annular clamps, wherein at least said outer race includes at least two parts, each part defining two longitudinally extending surfaces which mate with a corresponding longitudinal surface of the adjacent part, said surfaces defining a helix in their longitudinal extent, and said inner race includes a land on which said plurality of roller members are engaged and a clamp recess having spaced apart longitudinally spaced apart edge on each side of said land for receiving a respective one of said annular clamps, each clamp recess defining longitudinally spaced apart edges, and wherein each clamp recess defines spaced apart annular lubricating grooves adjacent the longitudinal edges of each clamp recess.

9. A bearing, comprising:

an annular inner race;

an annular outer race;

a plurality of roller members; and a cage for the roller members, said cage including two annular parts that in assembly define a plurality of cavities each one adapted to receive a roller member of said plurality of roller members, wherein each of said two annular parts including at least two pieces joined together by a tongue and groove connection, and each cavity is defined by said two annular parts with the longitudinally spaced edge surfaces of each cavity being defined by a different one of said two annular parts.

10. The bearing as defined in claim 9, wherein said longitudinally spaced edge surfaces are tapered radially outwardly toward the center of the bearing.

* * * * *